United States Patent [19]

Aono

[11] Patent Number: 4,765,722

[45] Date of Patent: Aug. 23, 1988

[54] ZOOM LENS

[75] Inventor: Yasuhiro Aono, Kawasaki, Japan

[73] Assignee: Nippon Kogaku K.K., Tokyo, Japan

[21] Appl. No.: 855,731

[22] Filed: Apr. 25, 1986

[30] Foreign Application Priority Data

May 11, 1985 [JP] Japan .................................. 60-100263

[51] Int. Cl.[4] ............................................. G02B 15/16
[52] U.S. Cl. ................................................... 350/427
[58] Field of Search ................................ 350/427, 423

[56] References Cited

U.S. PATENT DOCUMENTS 3,961,845 6/1976 Doi et al. ............................. 350/427

4,641,928 2/1987 Hamanishi ........................... 350/427

Primary Examiner—John K. Corbin
Assistant Examiner—Rebecca D. Gass
Attorney, Agent, or Firm—Shapiro and Shapiro

[57] ABSTRACT

A zoom lens comprising four lens groups the fourth group of which is composed of a front group and a rear group and the rear group is movable in a determined relation with the third lens group along the optical axis for compensating the variation of aberrations caused by zooming so that the zoom lens can always maintain good image-forming performance through the wide zooming range.

9 Claims, 2 Drawing Sheets

ZOOM LENS

BACKGROUND OF THE INVENTION

1. Field of the Invention

The present invention relates to a zoom lens and more particularly to an improved zoom lens especially suitable for a video camera.

2. Related Background Art

As compared with zoom lenses for a 35 mm camera, zoom lenses for a video camera generally have a larger aperture ratio and a larger zoom ratio. Such zoom lenses for a video camera well-known in the art are of the type comprising four lens groups. Of the four groups, the first one, as viewed from the object side, is a lens group of positive refractive power which remains stationary during zooming but moves for focusing. The second lens group has a negative refractive power and is movable for the change of magnification. The third lens group has a positive or negative refractive power and is moved for keeping the position of the image plane constant. The fourth lens group is a lens group fixed for image formation and has a positive refractive power.

For the zoom lens for a video camera, on the other hand, it has become desirable to reduce the size and increase the zoom ratio further. However, the above-mentioned type of known zoom lenses have some difficulties in answering these demands. In the known zoom lens for a video camera, only the second and third lens groups are moved for zooming. This type of zoom lens has a large variation of aberrations by zooming. It is very difficult to correct the variation of aberrations in a well-balanced manner and to keep good image-forming performance throughout the changing range of magnification. These difficult problems have prevented the realization of zoom lenses having a smaller size and a larger zoom ratio.

SUMMARY OF THE INVENTION

Accordingly, it is an object of the present invention to provide a zoom lens in which the variation of aberrations caused by changing the magnification is well corrected for a large zoom ratio and which can maintain good performance of image formation throughout the wide range of magnification corresponding to the large zoom ratio.

It is another object of the invention to provide a zoom lens of large zoom ratio which is small in size and light in weight for the large zoom ratio.

According to the present invention, the above objects are attained by a zoom lens comprising, from the object side, a first positive lens group movable along the optical axis for focusing; a second negative lens group movable along the optical axis for changing the magnification; a third lens group movable along the optical axis for keeping the position of the image plane constant; and a fourth lens group functioning as a relay group for image-forming. The zoom lens according to the present invention is featured in that the fourth lens group is composed of a front group and a rear group and the elements from the first lens group to said front group of the fourth lens group are so constructed as to substantially constitute an afocal system and that in at least a part of the range of magnification change by the movement of the second and third lens groups, said rear group of the fourth lens group can be moved along the optical axis while keeping a determined relation with the third lens group.

In the conventional system, the fourth lens group as a relay lens group is fixed relative to the image plane. In contrast, according to the present invention, a portion of the fourth lens group is moved along the optical axis at the magnification change from wide-angle end to telephoto end so that the portion of the fourth lens group can take a part in correcting the variation of aberrations. By virtue of this action of the fourth lens group the part which the magnification changing section should take in the correction of aberrations can be reduced. This enables minimizing the variation of magnification by zooming for the wide range of magnification and maintaining good image forming performance.

More specifically, in the above-mentioned type of conventional zoom lens, the variation of aberrations caused by zooming has to be corrected solely by the so-called magnification-changing section consisting of the first, second and third lens groups. Because of this the reduction of size and the increasing of zoom ratio result in the increase of the load which the first to third lens groups should bear to correct the aberrations. For this reason, it has been difficult to keep at a sufficiently low level all of the Seidel's five aberrations and in particular to correct the variations of spherical aberration and field curvature at the same time.

The present invention has solved the above problem. In the zoom lens according to the invention, the magnification-changing section (the first, second and third lens groups) and the relay group for the image formation (the fourth lens group) take their shares in the correction of variation of aberrations. It is to be noted that the elements from the first lens group to the front group of the fourth lens group constitute substantially an afocal system. By this feature it is possible to compensate not only the variation of spherical aberration but also the variation of field curvature.

More concretely, since the beam of rays is collimated between the front and rear groups in the fourth lens group, it is possible to vary the off-axial aberrations, in particular, the field curvature exclusively to a relatively great extent by moving the rear group of the fourth lens group almost without varying the spherical aberration. Making use of this property one can correct, by the magnification-changing section, mainly the spherical aberration, coma and distortion to a reasonable extent while correcting the remaining part of the aberrations which can not be sufficiently corrected by the section, by moving the rear group of the fourth lens group.

As known to those skilled in the art, the zoom lens generally considered to be excellent as the zoom lens for a video camera is of the type in which the third lens group has a negative refractive power and is moved forward and backward for changing the magnification in such fashion as to describe a locus of movement with a convexity toward the object side. When the present invention is embodied in this type of zoom lens, it has been found desirable that the amount of movement of the rear group should be less than $0.5 \times$ the maximum movement of the third lens group regarding the wide-angle end as the base. If the rear group of the fourth lens group is moved over the limit, there will be caused a problem of color shading. This is because the aperture stop usually lies between the third and fourth lens group and a tri-color separation prism for a color video camera is disposed behind it.

If the rear group of the fourth lens group is moved well beyond the limit, the position of the exit pupil varies too much to maintain the telecentricity required for the beam passing through the tri-color separation prism for color video camera. This causes the color shading.

Naturally, the amount of movement of the third lens group for correcting the position of the image plane must be determined in such manner that it is effective to correct not only the variation of image plane position caused by the movement of the second lens group but also the variation of image plane position caused by the rear group of the fourth lens group.

In a preferred embodiment, the rear group of the fourth lens group is moved in the direction opposite to the moving direction of the third lens group. And, it is preferable to satisfy the condition:

$$y = k \cdot x$$

$$-0.45 < k < -0.05$$

wherein, x is the moved distance by the third lens group from the base point (wide-angle end), y is the moved distance by the rear group of the fourth lens group, and k is a constant which is preferably a fixed value within the range.

When the above condition is satisfied, it is assured that the variation of field curvature resulting from the magnification change can be compensated well and the rear group of the fourth lens group can be moved by a simple driving mechanism. Consequently, it is possible to prevent the increasing of the total lens weight. If the value of constant k is over the upper limit of the above condition, then only insufficient effect for the correction of aberration can be attained by the movement of the rear group of the fourth lens group. On the other hand, if the value of k is under the lower limit, then the exit pupil position varies so much with the change of magnification that the problem of color shading may be caused.

Other objects, features and advantages of the invention will appear more fully from the following description taken in connection with the accompanying drawings.

DESCRIPTION OF PREFERRED EMBODIMENTS

Figure 1:
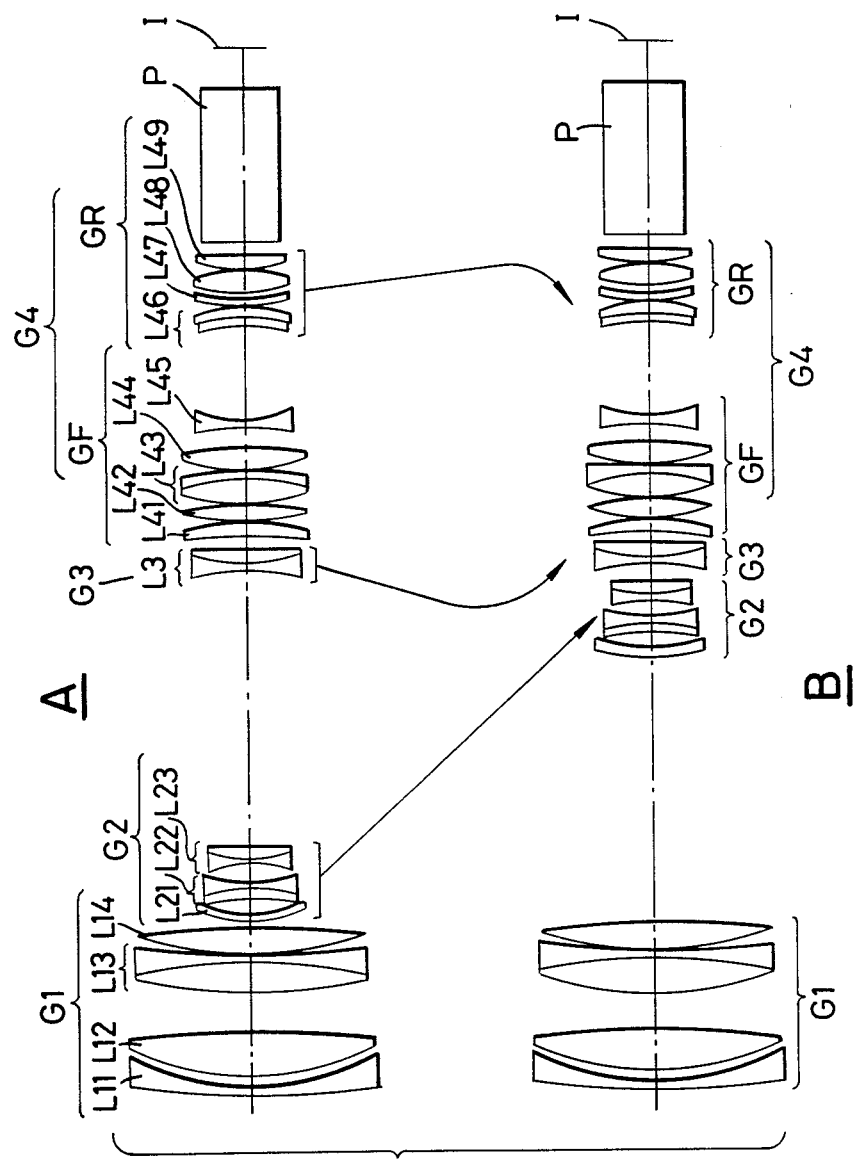
FIG. 1 shows at A the arrangement of lens elements of a first embodiment of the invention in its wide-angle end position, and at B the arrangement of lens elements of the same embodiment in its telephoto end position.

Referring to FIG. 1 showing the first embodiment of the invention, the zoom lens of the first embodiment comprises, from the object side, a first lens group $G_1$ of positive refractive power, a second lens group $G_2$ of negative refractive power, a third lens group $G_3$ of negative refractive power and a fourth lens group $G_4$ of positive refractive power. The first lens group $G_1$ is movable along the optical axis for focusing, the second lens group $G_2$ is movable along the optical axis for changing the magnification, and the third lens group $G_3$ is movable along the optical axis for keeping the position of the image plane fixed. The fourth lens group $G_4$ serves as a relay group for image-forming and is composed of a front group $G_F$ and a rear group $G_R$ with a relatively large air space between the front and rear groups. The rear group $G_R$ is movable in link with the movement of the third lens group $G_3$. When the magnification is changed by zooming from wide-angle end to telephoto end, the second lens group $G_2$ rectilinearly moves toward the image side, the third lens group $G_3$ moves non-linearly in such fashion as to describe a locus convex toward the object side and the rear group $G_R$ of the fourth lens group $G_4$ moves non-linearly in such fashion as to describe a locus convex toward the image side simultaneously with the movement of the third lens group $G_3$. The value of k, that is, the ratio of the amount of movement y of the rear group $G_R$ to the amount of the movement x of the third lens group $G_3$ is $-0.19$ in this case.

FIG. 1 at A shows the respective groups in wide-angle end position and at B in telephoto end position. In the space between A and B there are schematically shown the loci of the respective moving groups.

The constructions of the respective lens groups will be seen from FIG. 1.

The first lens group $G_1$ consists of four lens elements $L_{11}$, $L_{12}$, $L_{13}$ and $L_{14}$. $L_{11}$ is a negative meniscus lens with its convex surface facing the object side. $L_{12}$ is a positive lens with its stronger curvature surface facing the object side. $L_{13}$ is a cemented positive lens with its convex surface facing the object side. $L_{14}$ is a convexo-convex positive lens.

The second lens group $G_2$ consists of three lens elements $L_{21}$, $L_{22}$ and $L_{23}$. $L_{21}$ is a negative meniscus lens with its convex surface facing the object side. $L_{22}$ is a cemented negative lens with its stronger curvature surface facing the image side. $L_{23}$ is a cemented negative lens with its stronger curvature surface facing the image side.

The third lens group $G_3$ is composed of a cemented negative lens $L_3$ with its concave surface facing the object side.

The fourth lens group $G_4$ as a relay group is, as previously mentioned, composed of a front group $G_F$ and an axially moving rear group $G_R$. The front group $G_F$ consists of five elements $L_{41}$, $L_{42}$, $L_{43}$, $L_{44}$ and $L_{45}$ arranged in the named order from the object side. $L_{41}$ is a positive lens with its stronger curvature surface facing the image side. $L_{42}$ is a convexo-convex positive lens and $L_{43}$ is a cemented positive lens with its stronger curvature surface facing the object side. $L_{44}$ is a positive lens with its stronger curvature surface on the object side. $L_{45}$ is a negative lens with its stronger curvature surface facing the image side. The rear group $G_R$ consists of four lens elements $L_{46}$, $L_{47}$, $L_{48}$ and $L_{49}$ arranged in the named order from the object side. $L_{46}$ is a cemented meniscus lens with its concave surface facing the object side. $L_{47}$ is a negative meniscus lens with its convex surface facing the object side. $L_{48}$ is a convexo-convex positive lens. $L_{49}$ is a positive lens with its stronger curvature surface on the object side.

Disposed between the fourth lens group $G_4$ and the image plane I is a plane parallel member P corresponding to a color separation prism or various filters.

Detailed data of the first embodiment are shown in the following table, Table 1. The number in the leftmost column of the table indicates the order of the element from the object side. Values of refractive index and Abbe's number are values measured to the d-ray ($\lambda = 587.6$ nm).

TABLE 1

(First Embodiment)
focal length f = 24~275   zoom ratio 11.5
F number 1.8~2.8

| No | radius of curvature r | axial thickness spacing d | refractive index n | Abbe's number $\nu$ | |
|---|---|---|---|---|---|
| 1 | 352.266 | 4.500 | 1.74810 | 52.28 | $G_1$ |
| 2 | 110.236 | 4.650 | | | |
| 3 | 115.512 | 18.000 | 1.49782 | 82.28 | |
| 4 | −548.612 | 16.811 | | | |
| 5 | 199.992 | 13.000 | 1.49782 | 82.28 | |
| 6 | −311.542 | 4.500 | 1.80218 | 44.74 | |
| 7 | 590.405 | 0.200 | | | |
| 8 | 190.078 | 11.500 | 1.59319 | 67.87 | |
| 9 | −415.671 | $d_9$ = variable | | | |
| 10 | 64.810 | 3.500 | 1.71300 | 53.97 | $G_2$ |
| 11 | 51.096 | 6.500 | | | |
| 12 | −327.215 | 5.000 | 1.62004 | 36.34 | |
| 13 | −55.120 | 1.800 | 1.59319 | 67.87 | |
| 14 | 52.296 | 8.000 | | | |
| 15 | −49.009 | 1.800 | 1.59319 | 67.87 | |
| 16 | 56.889 | 5.500 | 1.75692 | 31.70 | |
| 17 | 913.053 | $d_{17}$ = variable | | | |
| 18 | −76.034 | 2.200 | 1.76684 | 46.76 | $G_3$ |
| 19 | 87.685 | 5.500 | 1.78470 | 26.07 | |
| 20 | −852.732 | $d_{20}$ = variable | | | |
| 21 | −365.838 | 7.200 | 1.44679 | 91.18 | $G_F$ |
| 22 | −57.422 | 0.200 | | | |
| 23 | 186.089 | 6.800 | 1.44679 | 91.18 | |
| 24 | −116.984 | 0.200 | | | |
| 25 | 91.164 | 11.000 | 1.49782 | 82.28 | |
| 26 | −69.946 | 2.500 | 1.80454 | 39.59 | |
| 27 | −2036.572 | 0.200 | | | |
| 28 | 49.612 | 10.500 | 1.55115 | 49.61 | |
| 29 | −302.205 | 8.553 | | | |
| 30 | −239.314 | 2.400 | 1.79668 | 45.52 | |
| 31 | 49.660 | $d_{31}$ = variable | | | |
| 32 | −51.041 | 2.200 | 1.69680 | 55.61 | $G_R$ |
| 33 | −94.745 | 6.500 | 1.49782 | 82.28 | |
| 34 | −44.200 | 0.200 | | | |
| 35 | 167.722 | 2.500 | 1.72000 | 50.28 | |
| 36 | 44.335 | 1.500 | | | |
| 37 | 46.194 | 11.000 | 1.49782 | 82.28 | |
| 38 | −90.497 | 0.200 | | | |
| 39 | 67.498 | 6.000 | 1.49782 | 82.28 | |
| 40 | −494.287 | | | | |

| f | 24. | 50. | 120. | 275. |
|---|---|---|---|---|
| $d_9$ | 1.79 | 52.73 | 92.10 | 115.14 |
| $d_{17}$ | 122.32 | 59.51 | 12.65 | 9.16 |
| $d_{20}$ | 5.60 | 17.48 | 24.97 | 5.42 |
| $d_{31}$ | 42.33 | 44.59 | 46.01 | 42.30 |

In this embodiment, the prism, filters etc. disposed between the fourth lens group $G_4$ and the image plane correspond to the plane parallel member P having a length of 69 mm, a refractive index of 1.60881 and an Abbe's number of 59. The zoom lens of the above-shown first embodiment has been designed including this plane parallel member P.

As shown above, the zoom lens of the first embodiment has a wide range of magnification change represented by the zoom ratio of 11.5. Aberrations have been corrected very well throughout the wide zoom range. It is obvious that this zoom lens exhibits excellent image-forming performance a superior than not only the conventional zoom lens for a video camera but also the conventional zoom lens for a 35 mm single-lens reflex camera. For its excellent performance, the zoom lens of the first embodiment may be satisfactorily used for the so-called super fine television which is under development.

Figure 2:
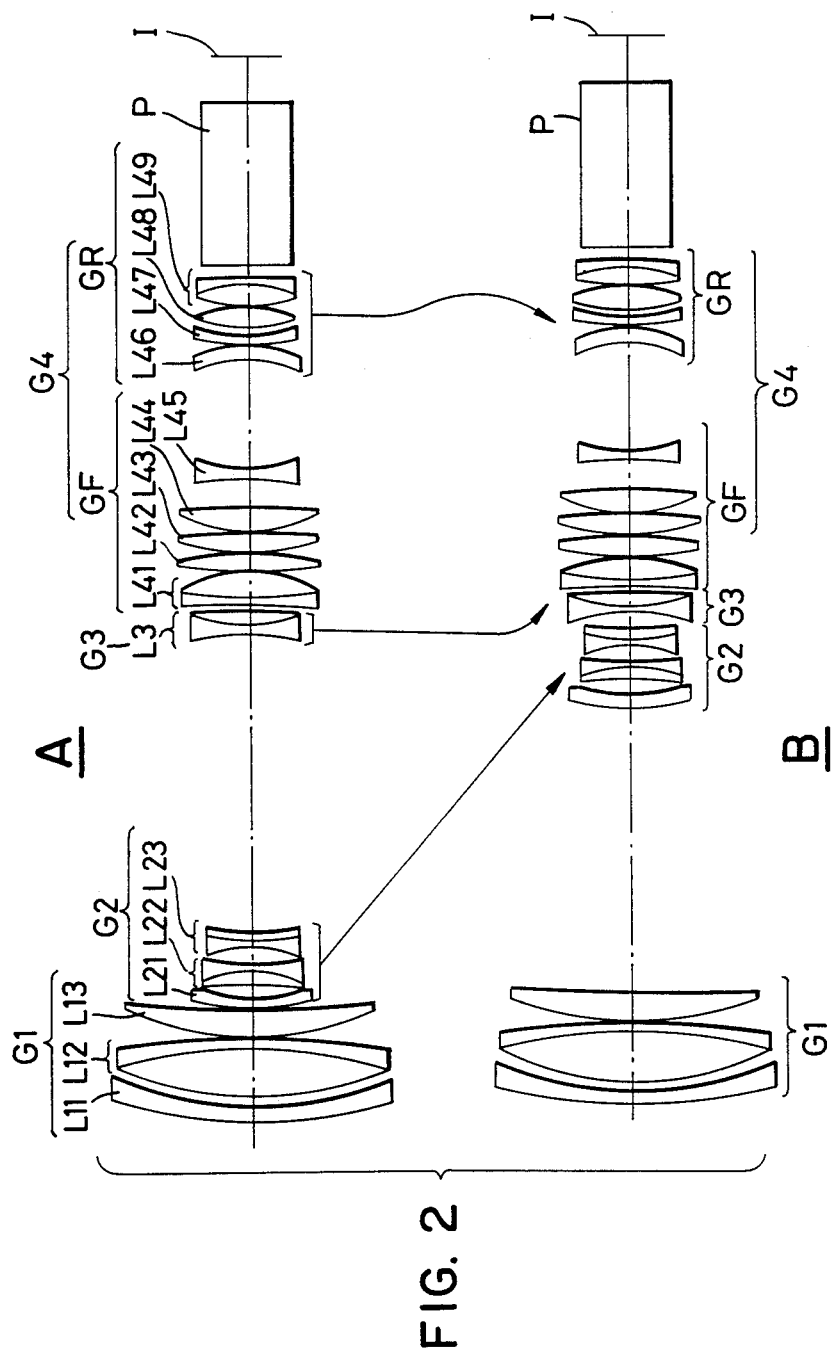
FIG. 2 shows at A the arrangement of lens elements of a second embodiment of the invention in its wide-angle end position, and at B the arrangement of lens elements of the same embodiment in its telephoto end position.

FIG. 2 shows a second embodiment of the invention. The construction of the zoom lens of this second embodiment is basically the same as that of the above-shown first embodiment. Slight differences between the two embodiments will be found in concrete structures of the respective lens groups and in the manner of movement of the rear group of the fourth lens group $G_4$ as will be described hereinafter.

Referring to FIG. 2, the first lens group $G_1$ of the zoom lens comprises three lens elements $L_{11}$, $L_{12}$ and $L_{13}$ arranged in this order from the object side. $L_{11}$ is a negative meniscus lens with its convex surface facing the object side. $L_{12}$ is a cemented positive lens with its stronger curvature surface on the object side. $L_{13}$ is a positive lens with its stronger curvature surface on the object side.

The second and third lens groups $G_2$ and $G_3$ have substantially the same structures as those of the first embodiment.

The fourth lens group $G_4$ of this second embodiment is different from that of the first embodiment in the following points:

In the front group $G_F$, the third component $L_{43}$ is a single positive lens and the most-object side component $L_{41}$ is a cemented positive lens.

In the rear group $G_R$, the most-object side component $L_{46}$ is composed of a single meniscus lens and the most-image side component $L_{49}$ is composed of a cemented positive lens.

Other components of the second embodiment correspond to those of the first embodiment.

When the magnification is changed by zooming from wide-angle end to telephoto end in the zoom lens of the second embodiment, the second lens group $G_2$ moves toward the image side linearly and the third lens group $G_3$ moves forward and backward in such fashion as to describe a locus convex toward the object side at the same time. During the step of zooming from wide-angle end to medium focal length position (about f=50 mm), however, the rear group $G_R$ of the fourth lens group $G_4$ remains fixed relative to the image plane. At the next step of zooming from the medium focal length position to the telephoto end, the rear group $G_R$ moves forward and backward in such fashion as to describe a locus curve convex toward the image side. The direction of this movement of the rear group $G_R$ is opposite to that of the third lens group $G_3$. The ratio of the amount of this movement of the rear group $G_R$ to the amount of movement of the third lens group $G_3$ is naturally variable depending upon the latter, but the ratio is under 0.5.

Detailed lens data of the second embodiment are shown in the following table, Table 2.

TABLE 2

(Second Embodiment)
focal length f = 24~275   zoom ratio 11.5
F number 1.8~2.7

| No | radius of curvature r | axial thickness spacing d | refractive index n | Abbe's number $\nu$ | |
|---|---|---|---|---|---|
| 1 | 206.936 | 4.500 | 1.80454 | 39.59 | $G_1$ |
| 2 | 118.413 | 4.000 | | | |
| 3 | 118.361 | 20.000 | 1.49782 | 82.28 | |
| 4 | −202.417 | 4.500 | 1.80454 | 39.59 | |
| 5 | −336.044 | 0.200 | | | |
| 6 | 139.484 | 11.500 | 1.49782 | 82.28 | |

TABLE 2-continued (Second Embodiment)
focal length f = 24~275 zoom ratio 11.5
F number 1.8~2.7

| | | | | | |
|---|---|---|---|---|---|
| 7 | 1028.233 | $d_7$ = variable | | | |
| 8 | 76.219 | 3.500 | 1.71300 | 53.97 | $G_2$ |
| 9 | 49.804 | 6.400 | | | |
| 10 | −265.398 | 5.500 | 1.62004 | 36.34 | |
| 11 | −52.105 | 1.800 | 1.59319 | 67.87 | |
| 12 | 104.322 | 6.500 | | | |
| 13 | −53.883 | 1.800 | 1.59319 | 67.87 | |
| 14 | 50.678 | 5.500 | 1.72825 | 28.34 | |
| 15 | 174.235 | $d_{15}$ = variable | | | |
| 16 | −73.170 | 2.200 | 1.79668 | 45.52 | $G_3$ |
| 17 | 99.202 | 5.500 | 1.78470 | 26.07 | |
| 18 | −358.046 | $d_{18}$ = variable | | | |
| 19 | −396.866 | 2.600 | 1.78797 | 47.53 | $G_F$ |
| 20 | 280.141 | 10.000 | 1.49782 | 82.28 | |
| 21 | −64.951 | 0.200 | | | |
| 22 | 306.126 | 7.800 | 1.49782 | 82.28 | |
| 23 | −128.834 | 0.200 | | | |
| 24 | 104.408 | 7.400 | 1.49782 | 82.28 | |
| 25 | −507.418 | 0.200 | | | |
| 26 | 49.839 | 9.700 | 1.44679 | 91.18 | |
| 27 | −636.197 | 12.751 | | | |
| 28 | −174.832 | 2.400 | 1.86994 | 39.78 | |
| 29 | 57.492 | $d_{29}$ = variable | | | |
| 30 | −38.368 | 6.669 | 1.15168 | 64.12 | $G_R$ |
| 31 | −38.785 | 0.200 | | | |
| 32 | 152.240 | 2.500 | 1.71300 | 53.97 | |
| 33 | 52.895 | 2.300 | | | |
| 34 | 54.069 | 9.000 | 1.49782 | 82.28 | |
| 35 | −72.922 | 0.200 | | | |
| 36 | 80.420 | 8.500 | 1.49782 | 82.28 | |
| 37 | −52.472 | 2.500 | 1.62041 | 60.29 | |
| 38 | −319.412 | 5.000 | | | |

| f | 24. | 50. | 120. | 275. |
|---|---|---|---|---|
| $d_9$ | 0.56 | 51.40 | 91.05 | 114.36 |
| $d_{15}$ | 121.00 | 60.31 | 9.25 | 7.39 |
| $d_{18}$ | 2.27 | 12.12 | 23.53 | 2.08 |
| $d_{29}$ | 45.08 | 45.08 | 49.55 | 45.08 |

In this embodiment also, the prism, filters etc. disposed between the fourth lens group G and the image plane correspond to the plane parallel member P having a length of 69 mm, a refractive index of 1.60881 and an Abbe's number of 59. The zoom lens of the above-shown second embodiment has been designed including this plane parallel member P.

Also, the zoom lens of this embodiment also has a wide magnification changing range represented by the zoom ratio of 11.5. It is obvious that aberrations have been corrected very well throughout the wide zoom range.

As readily understood from the foregoing, according to the present invention, the fourth lens group serving as a relay group is composed of a front group and a rear group and the rear group is moved to adequately correct the variation of aberration such as field curvature which can only insufficiently be corrected by the magnification changing section of the zoom lens. Therefore, the present invention enables realization of a zoom lens which has a relatively large zoom ratio and which can always maintain good image-forming performance throughout the wide magnification-changing area at the large zoom ratio.

While the invention has been particularly shown and described with reference to preferred embodiments thereof, it will be understood by those skilled in the art that various changes and modifications may be made without departing from the spirit and scope of the invention.

What is claimed is:

1. A zoom lens comprising, in succession from the object side:
    a first lens group of positive refractive power movable along the optical axis for focusing;
    a second lens group of negative refractive power movable along the optical axis for changing the magnification;
    a third lens group movable along the optical axis for keeping the position of the image plane fixed; and
    a fourth lens group serving as a relay group for forming an image; wherein
    said fourth lens group is composed of a front group on the object side and a rear group on the image side, and the lens groups from the first lens group to said front group of the fourth lens group constitute together substantially an afocal system, and
    said rear group of the fourth lens group is movable in a determined relation with the third lens group at least in a part of the range of the magnification change by the movement of said second and third lens groups;
    wherein said third lens group has a negative refractive power and both of the front and rear groups of said fourth lens group have a positive refractive power and wherein said third lens group moves forward and backward for changing magnification in such fashion as to describe a locus convex toward the object side and wherein the amount of movement of said rear group of the fourth lens group is less than 0.5 times the amount of the movement of the third lens group.

2. A zoom lens according to claim 1, wherein said third lens group and said rear group of the fourth lens group are so moved as to satisfy the condition:

$$y = k \cdot x$$

$$-0.45 < k < -0.05$$

wherein, x is the amount of the maximum movement of the third lens group for changing magnification, taking the wide-angle end as the base; and
    y is the amount of the maximum movement of the rear group of the fourth lens group at the magnification change, taking the wide-angle end as the base.

3. A zoom lens according to claim 2, wherein said first lens group consists of a negative meniscus lens with its convex surface facing the object side, a cemented positive lens with its stronger curvature surface facing the object side and a positive lens with its stronger curvature surface on the object side arranged in this order from the object side, said front group of the fourth lens group consists of a cemented positive lens, a convexo-convex positive lens, a positive lens with its convex surface facing the object side, a positive lens with its stronger curvature surface on the object side and a negative lens with its stronger curvature surface facing the image side arranged in this order from the object side and said rear group of the fourth lens group consists of a meniscus lens with its concave surface facing the object side, a negative meniscus lens with its convex surface facing the object side, a convexo-convex lens and a cemented positive lens arranged in this order from the object side.

4. A zoom lens according to claim 1 characterized by the following data:

focal length f = 24~275  zoom ratio 11.5
F number 8~2.8

| No | radius of curvature r | axial thickness spacing d | refractive index n | Abbe's number ν | |
|---|---|---|---|---|---|
| 1 | 352.266 | 4.500 | 1.74810 | 52.28 | $G_1$ |
| 2 | 110.236 | 4.650 | | | |
| 3 | 115.512 | 18.000 | 1.49782 | 82.28 | |
| 4 | −548.612 | 16.811 | | | |
| 5 | 199.992 | 13.000 | 1.49782 | 82.28 | |
| 6 | −311.542 | 4.500 | 1.80218 | 44.74 | |
| 7 | 590.405 | 0.200 | | | |
| 8 | 190.078 | 11.500 | 1.59319 | 67.87 | |
| 9 | −415.671 | $d_9$ = variable | | | |
| 10 | 64.810 | 3.500 | 1.71300 | 53.97 | $G_2$ |
| 11 | 51.096 | 6.500 | | | |
| 12 | −327.215 | 5.000 | 1.62004 | 36.34 | |
| 13 | −55.120 | 1.800 | 1.59319 | 67.87 | |
| 14 | 52.296 | 8.000 | | | |
| 15 | −49.009 | 1.800 | 1.59319 | 67.87 | |
| 16 | 56.889 | 5.500 | 1.75692 | 31.70 | |
| 17 | 913.053 | $d_{17}$ = variable | | | |
| 18 | −76.034 | 2.200 | 1.76684 | 46.76 | $G_3$ |
| 19 | 87.685 | 5.500 | 1.78470 | 26.07 | |
| 20 | −852.732 | $d_{20}$ = variable | | | |
| 21 | −365.838 | 7.200 | 1.44679 | 91.18 | $G_F$ |
| 22 | −57.422 | 0.200 | | | |
| 23 | 186.089 | 6.800 | 1.44679 | 91.18 | |
| 24 | −116.984 | 0.200 | | | |
| 25 | 91.164 | 11.000 | 1.49782 | 82.28 | |
| 26 | −69.946 | 2.500 | 1.80454 | 39.59 | |
| 27 | −2036.572 | 0.200 | | | |
| 28 | 49.612 | 10.500 | 1.55115 | 49.61 | |
| 29 | −302.205 | 8.553 | | | |
| 30 | −239.314 | 2.400 | 1.79668 | 45.52 | |
| 31 | 49.660 | $d_{31}$ = variable | | | |
| 32 | −51.041 | 2.200 | 1.69680 | 55.61 | $G_R$ |
| 33 | −94.745 | 6.500 | 1.49782 | 82.28 | |
| 34 | −44.200 | 0.200 | | | |
| 35 | 167.722 | 2.500 | 1.72000 | 50.28 | |
| 36 | 44.335 | 1.500 | | | |
| 37 | 46.194 | 11.000 | 1.49782 | 82.28 | |
| 38 | −90.497 | 0.200 | | | |
| 39 | 67.498 | 6.000 | 1.49782 | 82.28 | |
| 40 | −494.287 | | | | |

| f | 24. | 50. | 120. | 275. |
|---|---|---|---|---|
| $d_9$ | 1.79 | 52.73 | 92.10 | 115.14 |
| $d_{17}$ | 122.32 | 59.51 | 12.65 | 9.16 |
| $d_{20}$ | 5.60 | 17.48 | 24.97 | 5.42 |
| $d_{31}$ | 42.33 | 44.59 | 46.01 | 42.30 |

5. A zoom lens according to claim 1 characterized by the following data:

focal length f = 24~275  zoom ratio 11.5
F number 8~2.7

| No | radius of curvature r | axial thickness spacing d | refractive index n | Abbe's number ν | |
|---|---|---|---|---|---|
| 1 | 206.936 | 4.500 | 1.80454 | 39.59 | $G_1$ |
| 2 | 118.413 | 4.000 | | | |
| 3 | 118.361 | 20.000 | 1.49782 | 82.28 | |
| 4 | −202.417 | 4.500 | 1.80454 | 39.59 | |
| 5 | −336.044 | 0.200 | | | |
| 6 | 139.484 | 11.500 | 1.49782 | 82.28 | |
| 7 | 1028.233 | $d_7$ = variable | | | |
| 8 | 76.219 | 3.500 | 1.71300 | 53.97 | $G_2$ |
| 9 | 49.804 | 6.400 | | | |
| 10 | −265.398 | 5.500 | 1.62004 | 36.34 | |
| 11 | −52.105 | 1.800 | 1.59319 | 67.87 | |
| 12 | 104.322 | 6.500 | | | |
| 13 | −53.883 | 1.800 | 1.59319 | 67.87 | |
| 14 | 50.678 | 5.500 | 1.72825 | 28.34 | |
| 15 | 174.235 | $d_{15}$ = variable | | | |
| 16 | −73.170 | 2.200 | 1.79668 | 45.52 | $G_3$ |
| 17 | 99.202 | 5.500 | 1.78470 | 26.07 | |
| 18 | −358.046 | $d_{18}$ = variable | | | |
| 19 | −396.866 | 2.600 | 1.78797 | 47.53 | $G_F$ |
| 20 | 280.141 | 10.000 | 1.49782 | 82.28 | |
| 21 | −64.951 | 0.200 | | | |
| 22 | 306.126 | 7.800 | 1.49782 | 82.28 | |
| 23 | −128.834 | 0.200 | | | |
| 24 | 104.408 | 7.400 | 1.49782 | 82.28 | |
| 25 | −507.418 | 0.200 | | | |
| 26 | 49.839 | 9.700 | 1.44679 | 91.18 | |
| 27 | −636.197 | 12.751 | | | |
| 28 | −174.832 | 2.400 | 1.86994 | 39.78 | |
| 29 | 57.492 | $d_{29}$ = variable | | | |
| 30 | −38.368 | 6.669 | 1.15168 | 64.12 | $G_R$ |
| 31 | −38.785 | 0.200 | | | |
| 32 | 152.240 | 2.500 | 1.71300 | 53.97 | |
| 33 | 52.895 | 2.300 | | | |
| 34 | 54.069 | 9.000 | 1.49782 | 82.28 | |
| 35 | −72.922 | 0.200 | | | |
| 36 | 80.420 | 8.500 | 1.49782 | 82.28 | |
| 37 | −52.472 | 2.500 | 1.62041 | 60.29 | |
| 38 | −319.412 | 5.000 | | | |

| f | 24. | 50. | 120. | 275. |
|---|---|---|---|---|
| $d_9$ | 0.56 | 51.40 | 91.05 | 114.36 |
| $d_{15}$ | 121.00 | 60.31 | 9.25 | 7.39 |
| $d_{18}$ | 2.27 | 12.12 | 23.53 | 2.08 |
| $d_{29}$ | 45.08 | 45.08 | 49.55 | 45.08 |

6. A zoom lens comprising, in succession from the object side:
a first lens group of positive refractive power movable along the optical axis for focusing;
a second lens group of negative refractive power movable along the optical axis for changing the magnification;
a third lens group movable along the optical axis for keeping the position of the image plane fixed; and
a fourth lens group serving as a relay group for forming an image; wherein
said fourth lens group is composed of a front group on the object side and a rear group on the image side, and the lens groups from the first lens group to said front group of the fourth lens group constitute together substantially an afocal system, and
said rear group of the fourth lens group is movable in a determined relation with the third lens group at least in a part of the range of the magnification change by the movement of said second and third lens groups;
wherein said second lens group consists of a negative meniscus lens with its convex surface facing the object side, a cemented negative lens with its stronger curvature surface on the image side and a cemented negative lens with its stronger curvature surface on the object side arranged in this order from the object side, and said third lens group consists of a cemented negative lens with its concave surface facing the object side.

7. A zoom lens according to claim 6, wherein said first lens group consists of a negative meniscus lens with its convex surface facing the object side, a positive lens with its stronger curvature surface facing the object side, a cemented positive lens with its convex surface on the object side and a convexo-convex positive lens arranged in this order from the object side, said front group of the fourth lens group consists of a positive lens with its stronger curvature surface facing the image side, a convexo-convex positive lens, a cemented positive lens with its stronger curvature surface on the object side, a positive lens with its stronger curvature surface facing the object side and a negative lens with its stronger curvature surface on the image side arranged in this order from the object side and said rear group of the fourth lens group consists of a cemented meniscus lens with its concave surface facing the object side, a negative meniscus lens with its convex surface facing the object side, a convexo-convex positive lens and a positive lens with its stronger curvature surface on the object side arranged in this order from the object side.

8. A zoom lens comprising, in succession from the object side:
- a first lens group of positive refractive power movable along the optical axis for focusing;
- a second lens group of negative refractive power movable along the optical axis for changing the magnification;
- a third lens group movable along the optical axis for keeping the position of the image plane fixed; and
- a fourth lens group serving as a relay group for forming an image; wherein
- said fourth lens group is composed of a front group on the object side and a rear group on the image side, and the lens groups from the first lens group to said front group of the fourth lens group constitute together substantially an afocal system, and
- said rear group of the fourth lens group is movable in a determined relation with the third lens group at least in a part of the range of the magnification change by the movement of said second and third lens groups;
- wherein both of the front and rear groups of said fourth lens group have a positive refractive power and wherein said third lens group moves forward and backward for changing magnification in such fashion as to describe a locus convex toward the object side and wherein the amount of movement of said rear group of the fourth lens group is less than 0.5 times the amount of the movement of the third lens group.

9. A zoom lens according to claim 8, wherein said rear group of said fourth lens group is movable to correct a variation of aberrations conforming to a movement of said second lens group.

* * * * *